United States Patent
Liu et al.

(10) Patent No.: US 7,680,664 B2
(45) Date of Patent: Mar. 16, 2010

(54) PARSIMONIOUS MODELING BY NON-UNIFORM KERNEL ALLOCATION

(75) Inventors: Peng Liu, Beijing (CN); Jian-Iai Zhou, Beijing (CN); Frank Kao-ping Soong, Beijing (CN)

(73) Assignee: Microsoft Corporation, Redmond, WA (US)

( * ) Notice: Subject to any disclaimer, the term of this patent is extended or adjusted under 35 U.S.C. 154(b) by 858 days.

(21) Appl. No.: 11/505,206

(22) Filed: Aug. 16, 2006

(65) Prior Publication Data
US 2008/0059183 A1    Mar. 6, 2008

(51) Int. Cl.
G10L 15/14    (2006.01)
G10L 15/28    (2006.01)

(52) U.S. Cl. .................. 704/256.2; 704/255; 704/256
(58) Field of Classification Search ............... None
See application file for complete search history.

(56) References Cited

U.S. PATENT DOCUMENTS

| | | | | |
|---|---|---|---|---|
| 6,141,641 | A * | 10/2000 | Hwang et al. | 704/243 |
| 6,226,612 | B1 | 5/2001 | Srenger et al. | 704/256.2 |
| 6,374,221 | B1 | 4/2002 | Haimi-Cohen | 704/256.1 |
| 6,606,595 | B1 | 8/2003 | Chengalvarayan | 704/256.5 |
| 6,714,910 | B1 | 3/2004 | Rose et al. | 704/256 |
| 6,934,678 | B1 | 8/2005 | Yang | 704/221 |
| 7,366,669 | B2 * | 4/2008 | Nishitani et al. | 704/256 |
| 7,437,288 | B2 * | 10/2008 | Shinoda | 704/240 |
| 7,526,414 | B2 * | 4/2009 | Comaniciu et al. | 703/2 |
| 2003/0200090 | A1 | 10/2003 | Kawazoe | 704/251 |
| 2003/0220792 | A1 | 11/2003 | Kobayashi et al. | 704/256.4 |
| 2005/0131694 | A1 * | 6/2005 | Nishitani et al. | 704/256 |
| 2006/0074654 | A1 | 4/2006 | Chu et al. | 704/242 |
| 2006/0074657 | A1 | 4/2006 | Huang | 704/246 |
| 2006/0085187 | A1 | 4/2006 | Barquilla | 704/243 |

OTHER PUBLICATIONS

Li, X. et al. "Optimal Clustering and Non-Uniform Allocation of Gaussian Kernels in Scalar Dimension for HMM Compression," IEEE ICASSP, pp. 669-672, 2005.*
B.H. Juang et al., "Hidden Markov Models for Speech Recognition" JSTOR: Technometrics: vol. 33, No. 3 (Aug. 1991), pp. 251-272.
Tasos Anastasakos et al., "Speaker Adaptive Training: A Maximum Likelihood Approach to Speaker Normalization" ICASSP '97, vol. 2 (1997), pp. 1043-1046.
Ajit V. Rao et al., "Deterministically Annealed Design of Hidden Markov Model Speech Recognizers" IEEE Transactions on Speech and Audio Processing, vol. 9, No. 2, Feb. 2001. pp. 111-126.

* cited by examiner

*Primary Examiner*—Matthew J Sked
(74) *Attorney, Agent, or Firm*—Theodore M. Magee; Westman, Champlin & Kelly, P.A.

(57) ABSTRACT

A multi-state pattern recognition model with non-uniform kernel allocation is formed by setting a number of states for a multi-state pattern recognition model and assigning different numbers of kernels to different states. The kernels are then trained using training data to form the multi-state pattern recognition model.

16 Claims, 5 Drawing Sheets

PARSIMONIOUS MODELING BY NON-UNIFORM KERNEL ALLOCATION

BACKGROUND

In pattern recognition systems, such as speech recognition, thumb print identification, face recognition and handwriting recognition, Hidden Markov Models (HMMs) have been successfully applied to model the input patterns. Hidden Markov Models provide a series of states for a set of basic tokens that are to be recognized from the input pattern. Under many systems, each state is represented by a mixture model containing a number of distributions, referred to as kernels. For example, in Gaussian mixture models, each state is associated with a plurality of Gaussian distributions. An observation vector is applied to each Gaussian and the resulting probabilities are combined using mixture weights to provide an overall probability of the state.

In such mixture models, the number of kernels assigned to each state is uniform across the states. Thus, the same number of distributions or kernels are trained for each state.

The discussion above is merely provided for general background information and is not intended to be used as an aid in determining the scope of the claimed subject matter.

SUMMARY

A multi-state pattern recognition model with non-uniform kernel allocation is formed by setting a number of states for a multi-state pattern recognition model and assigning different numbers of kernels to different states. The kernels are then trained using training data to form the multi-state pattern recognition model.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The embodiments described herein provide techniques for parsimoniously setting the number of kernels assigned to a state in a multi-state recognition model. Through these techniques, the resulting multi-state recognition model has different numbers of kernels assigned to different states. As a result, models with the same recognition accuracy as models found in the prior art can be achieved with fewer model parameters. Having fewer model parameters reduces the amount of storage needed for the recognition models and helps to speed recognition so that there is less delay between when the user speaks and when the corresponding text is displayed or the corresponding command is executed. Alternatively, if the same number of model parameters are used in the present embodiments as in the prior art, greater recognition accuracy can be achieved with the models formed under the present embodiments.

Examples of multi-state pattern recognition models include Hidden Markov Models or other multi-state models in which each state is represented by a mixture of kernels such as Gaussian distributions, Laplacian distributions or exponential distributions. Typically, such recognition models can be used in speech recognition, handwriting recognition, thumbprint analysis or facial recognition.

Figure 1:
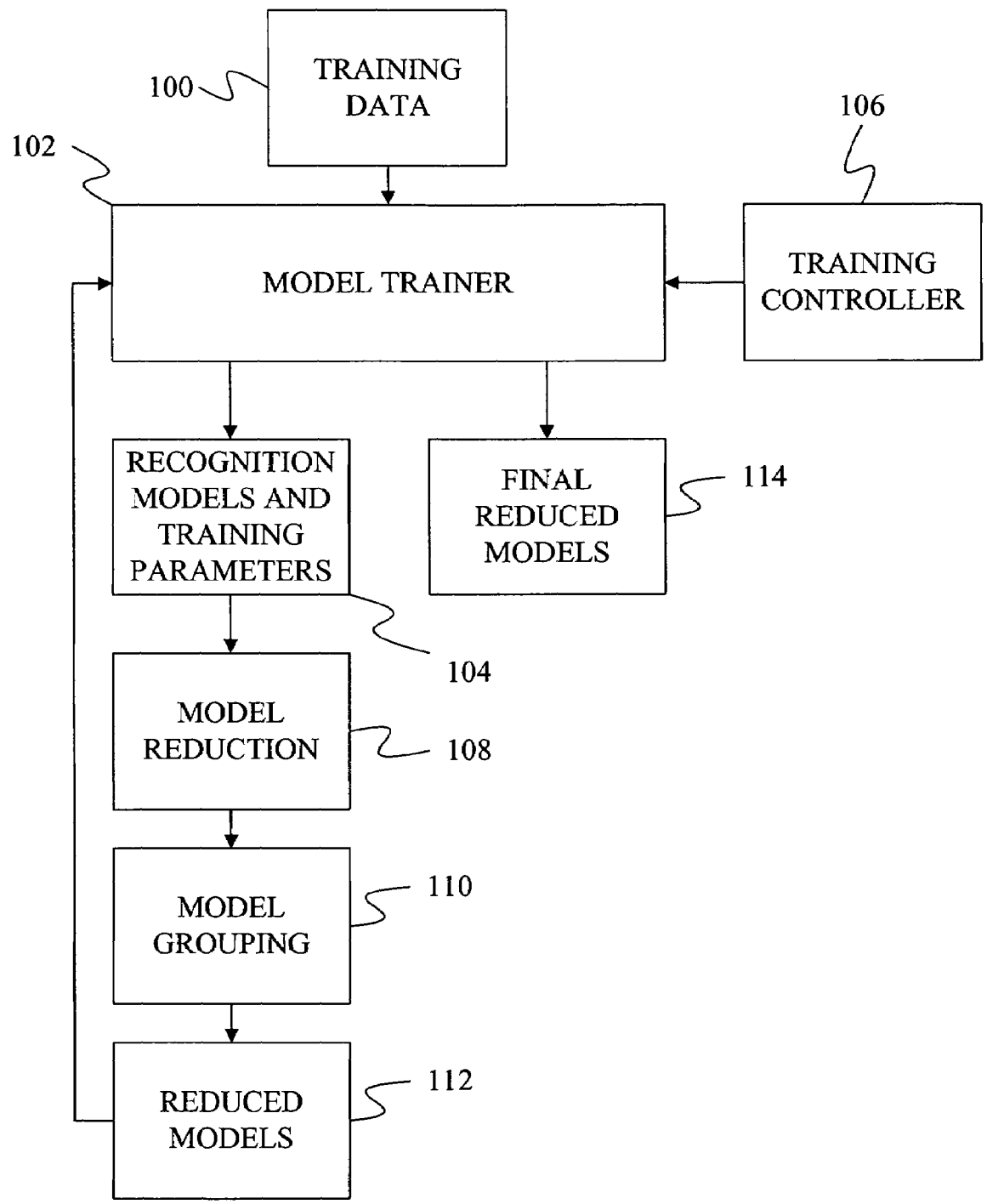
FIG. 1 is a block diagram of elements used in some embodiments.
Figure 2:
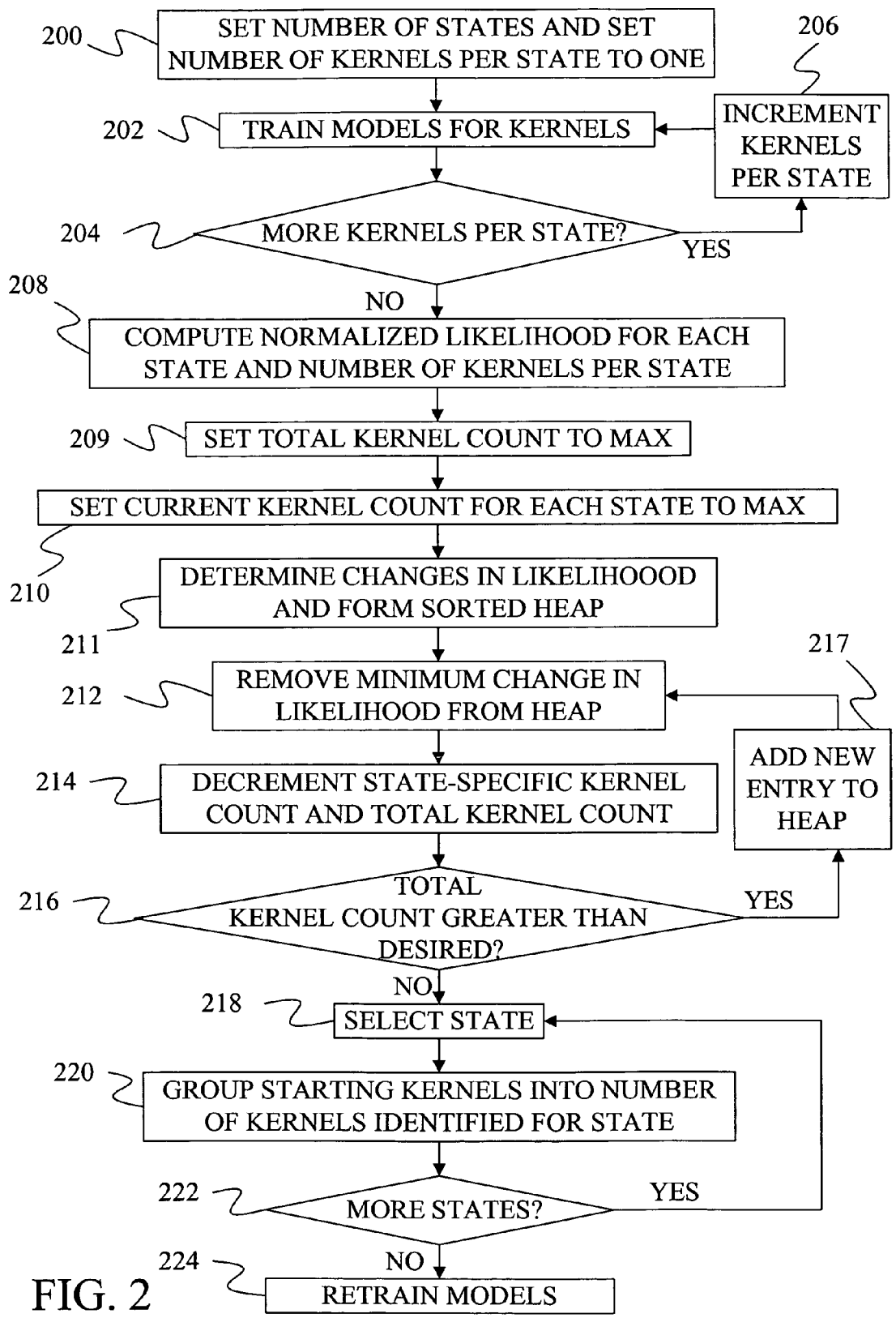
FIG. 2 is a flow diagram of a method for setting the number of kernels per state in the model.

FIG. 1 provides a block diagram of elements used in a method described by the flow diagram of FIG. 2 for setting the number of kernels per state in a recognition model. In step 200, the number of states is selected and the number of kernels per state is set to 1. At step 202, model trainer 102 trains the model parameters 104 that describe the kernels for the states and the transition probabilities for moving between states based on training data 100. For example, for kernels that are Gaussian distributions, model trainer 102 trains the means and variances of the Gaussian distributions and the mixture weights for combining the distributions, as well as the probabilities of transitioning between states. Under many embodiments, this training involves the Baum-Welch training algorithm.

Figure 3:
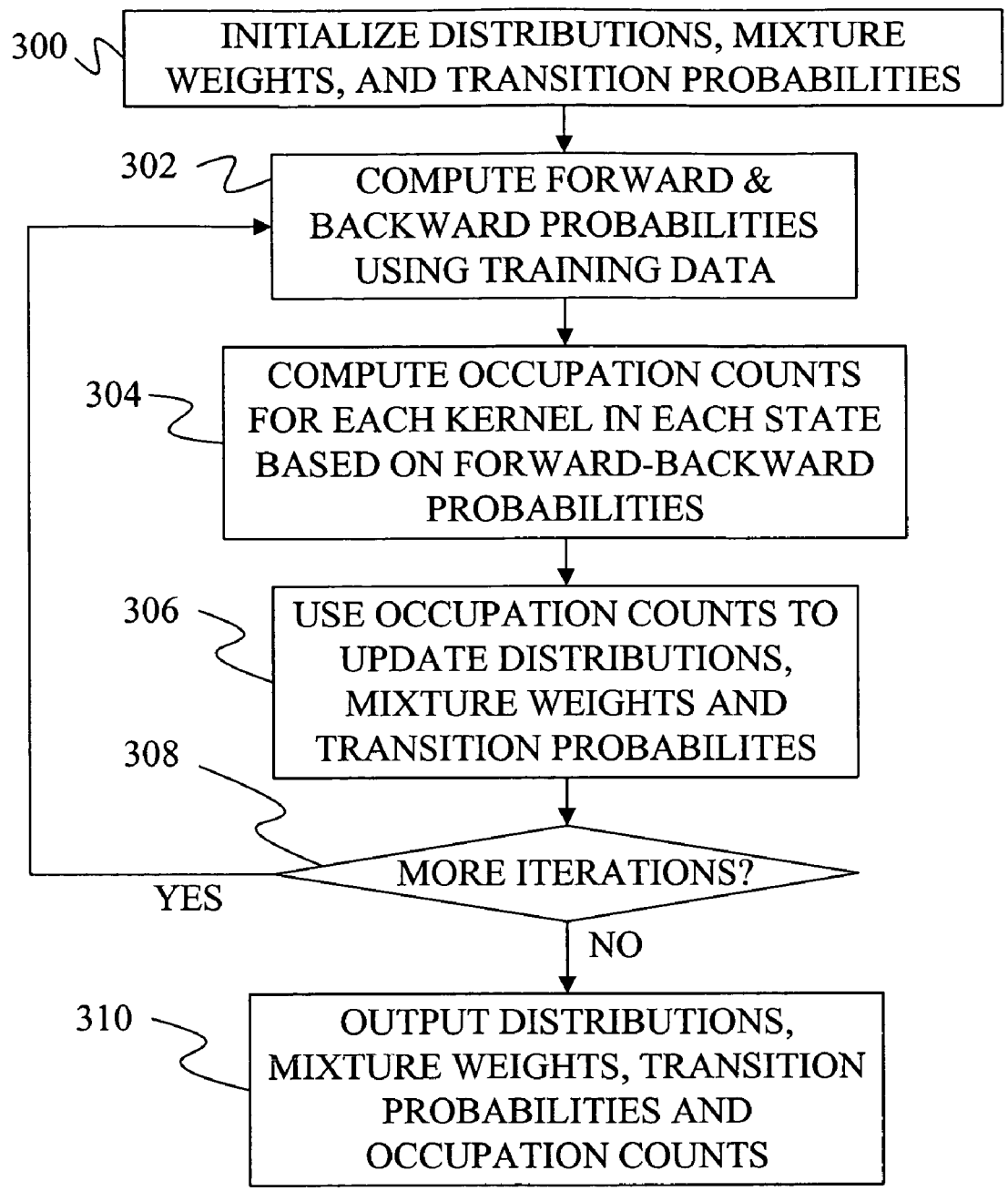
FIG. 3 is a flow diagram of Baum-Welch training.

FIG. 3 provides a flow diagram of the Baum-Welch training algorithm. In step 300 of FIG. 3, initial parameters describing the distributions for each kernel, mixture weights for each kernel, and transition probabilities are determined. The initial parameters can be taken from a previous model or can be determine using a small set of labeled training data that assigns observed training feature vectors to particular kernels in particular states at each time point. Based on this labeled data, the statistics necessary to from the initial parameters can be determined.

At step 302, forward and backward probabilities are computed for each state using training data. The forward and backward probabilities are computed as:

$$\alpha_t(j) = \left[\sum_{i=1}^{J} \alpha_{t-1}(i)a_{ij}\right]\sum_{k=1}^{K} c_{jk}b_{jk}(o_t) \qquad \text{EQ. 1}$$

$$\alpha_1(j) = \pi_j \sum_{k=1}^{K} c_{jk}b_{jk}(o_1) \qquad \text{EQ. 2}$$

$$\beta_t(j) = \left[\sum_{i=1}^{J} \beta_{t+1}(i)a_{ij}\sum_{k=1}^{K} c_{jk}b_{jk}(o_{t+1})\right] \qquad \text{EQ. 3}$$

$$\beta_T(j) = 1/J \qquad \text{EQ. 4}$$

where $\alpha_t(j)$ is the forward probability for state j at time t, $\beta_t(j)$ is the backward probability for state j at time t, J is the total number of states, T is the total number of frames of training data, K is the uniform number of kernels per state, $a_{ij}$ is a transition probability from state i to state j, $b_{jk}(o_t)$ is an observation probability for the kth distribution at state j for observed vector $o_t$ at time t, $c_{jk}$ is the mixture weight for the kth mixture component of state j, $\pi_j$ is a probability of initially being in state j.

At step 304, occupation counts for each kernel in each state are determined based on the forward-backward probabilities. Such occupation counts are calculated as:

$$\gamma_{t,j,k} = \frac{\left[\sum_{i=1}^{J} \alpha_{t-1}(i) a_{ij}\right] c_{jk} b_{jk}(o_t) \beta_t(j)}{\sum_{i=1}^{J} \alpha_T(i)} \qquad \text{EQ. 5}$$

$$\gamma_{j,k} = \sum_{t=1}^{T} \gamma_{t,j,k} \qquad \text{EQ. 6}$$

$$\gamma_j = \sum_{k=1}^{K} \gamma_{j,k} \qquad \text{EQ. 7}$$

where $\gamma_{t,j,k}$ is the occupation count for kernel k at state j at time frame t, $\gamma_{j,k}$ is the occupation count for kernel k at state j across all time frames and $\gamma_j$ is the occupation count for state j across all time frames.

At step 306, these occupation counts are used to update the distribution parameters, mixture weights and transition probabilities.

At step 308, the method determines if more training iterations are needed. If more iterations are needed, the process returns to step 302 to compute new forward and backward probabilities using the new distributions, mixture weights and transition probabilities. Steps 302, 304, 306 and 308 are repeated until the model converges. When the model converges, the distributions for each kernel, the mixture weight, the transition probabilities, and the occupation counts are output at step 310.

After the kernels have been trained, the process of FIG. 2 continues at step 204 where a training controller 106 determines if the number of kernels per state should be incremented and training repeated for the new number of kernels per state. Under the embodiment of FIG. 2, separate sets of models are trained for separate uniform numbers of kernels per state. If the number of kernels per state is to be incremented at step 204, the process continues at step 206 where training controller 106 increments the uniform number of kernels for each state. Thus, after step 206, every state has the same number of kernels as the other states. The process then returns to step 202 to train the models using the new number of kernels per state. Under most embodiments, this training uses the Baum-Welch training algorithm.

When the number of kernels per state has reached the desired maximum number of kernels per state at step 204, the process continues at step 208 where a model reduction unit 108 determines a normalized likelihood for each state using each of the trained models. Thus, a separate normalized likelihood is determined for every number of kernels per state for each state. Under one embodiment, the normalized likelihood is computed as:

$$\tilde{L}_j(m_j) = L_j(m_j) \overline{\gamma}_j / \gamma_j(m_j) \qquad \text{EQ. 8}$$

with $$L_j(m_j) = \sum_{t=1}^{T}\left[\left[\sum_{k=1}^{m_j} \gamma_{t,j,k}\right] \log \sum_{k=1}^{m_j} c_{jk} b_{jk}(o_t)\right] \qquad \text{EQ. 9}$$

$$\gamma_j(m_j) = \sum_{t=1}^{T} \sum_{k=1}^{m_j} \gamma_{t,j,k} \qquad \text{EQ. 10}$$

$$\overline{\gamma}_j = \frac{\sum_{m_j=1}^{N} \gamma_j(m_j)}{N} \qquad \text{EQ. 11}$$

where $\tilde{L}_j(m_j)$ is the normalized likelihood for state j with $m_j$ kernels, $L_j(m_j)$ is the likelihood computed for state j with $m_j$ kernels, $\gamma_j(m_j)$ is the posterior probability of state j given $m_j$ kernels, $\overline{\gamma}_j$ is the average occupation count of state j over all of the considered number of kernels, N is the maximum number of kernels used for each state, $b_{jk}(o_t)$ is an observation probability for the kth kernel at state j for observed vector $o_t$ at time t, $c_{jk}$ is the mixture weight for the kth mixture component of state j, and T is the number of frames in the training signals. The values found in equations 8-11 can be determined during model training.

The normalized likelihood of a state in equation 8 is computed by assuming that the likelihood of any state with $m_j$ kernels is independent of the model size of any other states.

After the normalized likelihoods have been determined, model reduction unit 108 sets a total kernel count to the number of states times the maximum number of kernels per state at step 209. At step 210, each state has its state-specific kernel count, $m_j$, set to the maximum number of kernels per state used in training. Thus, the process begins by assuming that all states will have the maximum number of kernels.

At step 211, model reduction unit 108 forms a sorted heap, with one entry for each state. Specifically, the heap is initialized by determining changes in likelihoods for all states defined as:

$$\Delta_j = \tilde{L}_j(m_j) - \tilde{L}_j(m_j - 1) \qquad \text{EQ. 12}$$

and then inserting the changes in likelihoods into the heap so that the heap is sorted from least to greatest change in likelihood.

In step 212, model reduction unit 108 begins a pruning process that will selectively remove kernels from individual states. This pruning process is based in part on an assumption that that all normalized state likelihood functions are convex or equivalently:

$$\tilde{L}(m) - \tilde{L}_j(m-1) \geq \tilde{L}_j(m+1) - \tilde{L}_j(m) \; (m>1, 1 \leq j \leq J) \qquad \text{EQ. 13}$$

Under this assumption, removing a kernel from any state always results in a reduction in likelihood.

The pruning process begins at step 212 where the minimum change in normalized likelihood is removed from the heap. At step 214, the number of kernels, $m_j$, for the state associated with the minimum change in likelihood and the total kernel count are each reduced by 1.

At step 216, the total kernel count is examined to determine if it is greater than a desired number of kernels. If it is greater than the desired number of kernels, a new entry for the state selected at step 212 is added to the sorted heap at step 217. Specifically, a new change in likelihood is calculated using equation 12 above with the new value for the state-specific kernel count, $m_j$. The process then returns to step 212 to remove another change in likelihood from the heap. Steps 212, 214, 216 and 217 are repeated until the desired total number of kernels is reached. Note that the process of steps 212, 214, 216, and 217 will affect different states differently resulting in a non-uniform distribution of kernels between states. Since this non-uniform distribution is formed by removing kernels to minimize the change in likelihood of the training data, the number of kernels assigned to each state is set to maximize the likelihood of the training data given the desired number of kernels.

After the desired number of kernels has been reached at step 216, the process continues at step 218 where a model grouping unit 110 selects one of the states. At step 220, the kernels trained for the state using the maximum number of kernels per state are grouped into the number of kernels identified for the state through the pruning steps. Under one embodiment, this clustering is done using Kullback-Libler divergence to measure kernel similarity. Under some embodiments, the kernels are initially clustered together in one cluster and are divided based on the Kullback-Libler divergence to form two clusters. This type of division continues until the number of kernels identified for the state has been reached. The kernels assigned to a cluster are then merged to form a single distribution that represents the cluster. For an embodiment that uses Gaussian kernels, each kernel in a cluster is defined as:

$$N(x;\mu_k,\Sigma_k)(1 \leq k \leq K) \qquad \text{EQ. 14}$$

where K is the number of kernels belonging to a cluster, $\mu_k$ is the mean of the $k^{th}$ Gaussian kernel and $\Sigma_k$ is the covariance of the Gaussian kernel. The merged Gaussian model N(o;v,B) is calculated as:

$$v = \sum_{k=1}^{K} \gamma_k \mu_k \bigg/ \sum_{k=1}^{K} \gamma_k \qquad \text{EQ. 15}$$

$$B = \sum_{k=1}^{K} \gamma_k [\Sigma_k + (v - \mu_k)(v - \mu_k)^T] \bigg/ \sum_{k=1}^{K} \gamma_k \qquad \text{EQ. 16}$$

At step 222, model grouping unit 110 determines if there are more states. If there are more states, the next state is selected by returning to step 218 and step 220 is repeated for the new state. When there are no more states at step 222, the reduced model 112 represented by the merged kernels is provided to model trainer 102, which retrains reduced model 112 using the Baum-Welch method at step 224. Thus, the models formed for each state in steps 212-222 are used as the initial models during training. The resulting model produced by model trainer 102 is final reduced model 114, which has a non-uniform distribution of kernels per state.

Figure 4:
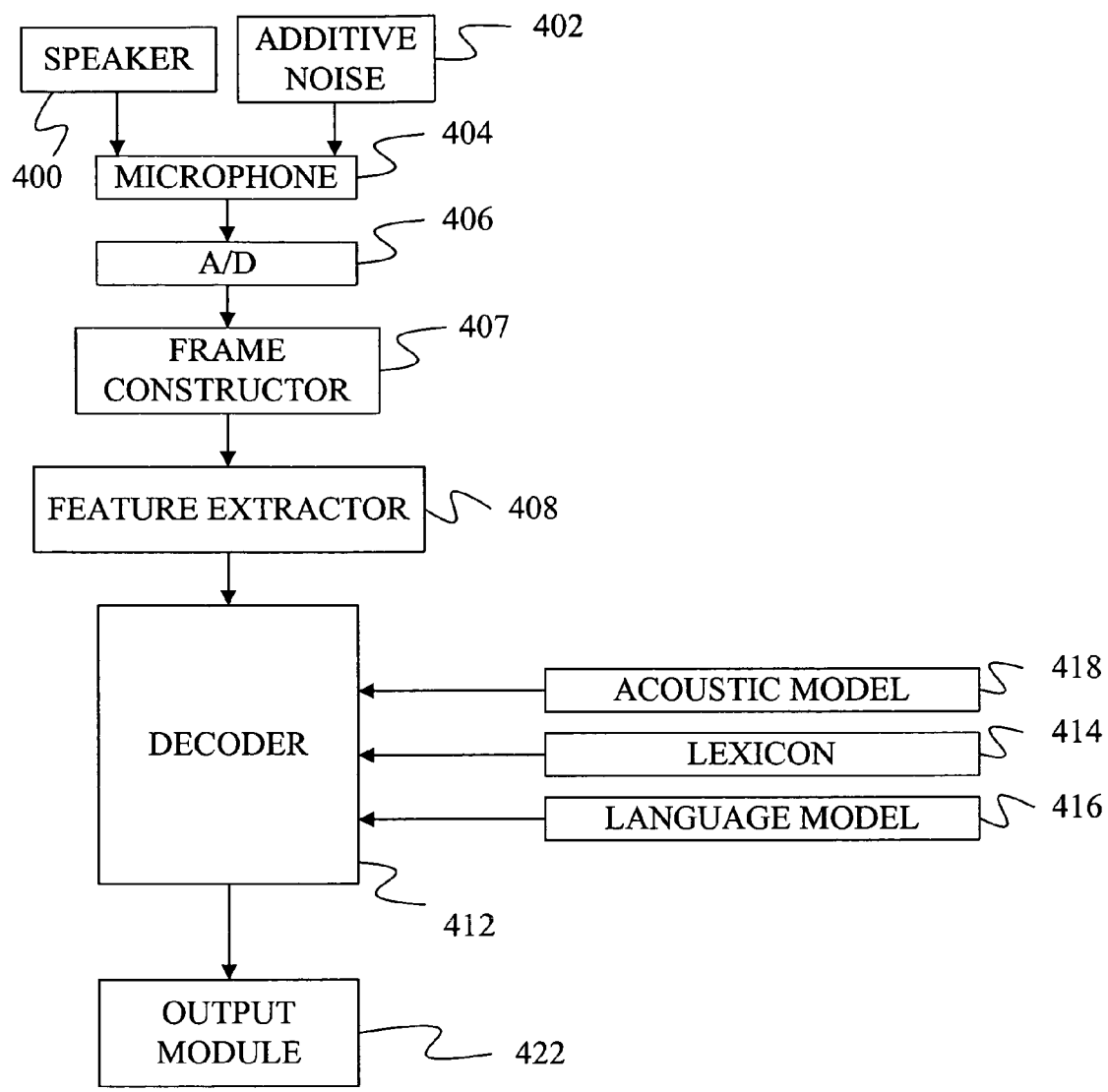
FIG. 4 is a block diagram of a speech recognition system in which a recognition model trained under some embodiments may be used.

FIG. 4 provides a block diagram of an environment in which a pattern recognition model trained using the process described above may be utilized.

In FIG. 4, a speaker 400, either a trainer or a user, speaks into a microphone 404. Microphone 404 also receives additive noise from one or more noise sources 402. The audio signals detected by microphone 404 are converted into electrical signals that are provided to analog-to-digital converter 406.

A-to-D converter 406 converts the analog signal from microphone 404 into a series of digital values. In several embodiments, A-to-D converter 406 samples the analog signal at 16 kHz and 16 bits per sample, thereby creating 32 kilobytes of speech data per second. These digital values are provided to a frame constructor 407, which, in one embodiment, groups the values into 25 millisecond frames that start 10 milliseconds apart.

The frames of data created by frame constructor 407 are provided to feature extractor 408, which extracts a feature from each frame. Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that the embodiments are not limited to these feature extraction modules and that other modules may be used.

The feature extraction module produces a stream of feature vectors that are each associated with a frame of the speech signal. This stream of feature vectors is provided to a decoder 412, which identifies a most likely sequence of words based on the stream of feature vectors, a lexicon 414, a language model 416, and an acoustic model 418 trained through the process described above. In some embodiments, decoder 412 may utilize one or more noise reduction techniques. The most probable sequence of hypothesis words is provided to an output module 422.

Although FIG. 4 depicts a speech recognition system, embodiments may be used in any pattern recognition system and is not limited to speech.

Figure 5:
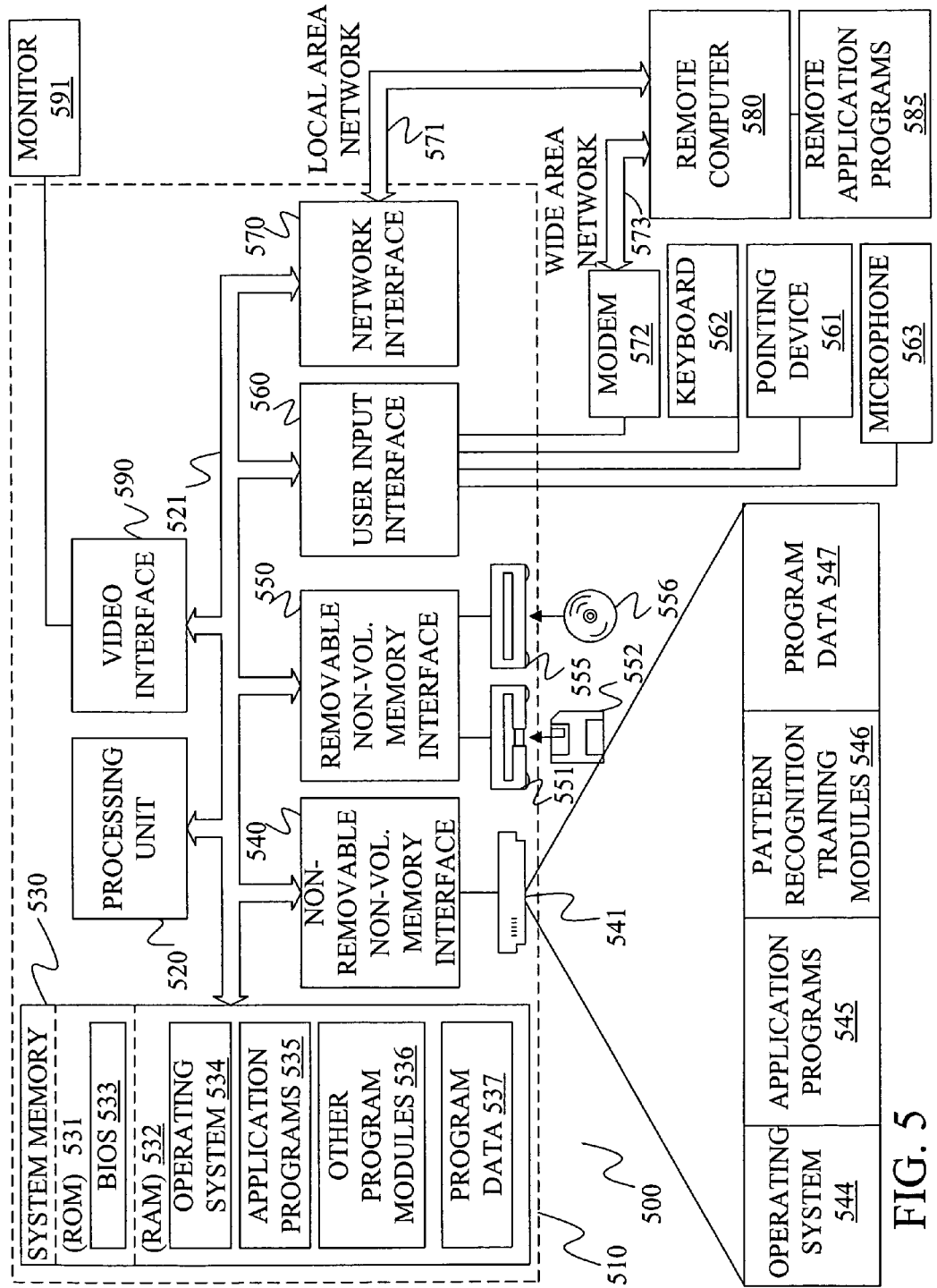
FIG. 5 is a block diagram of a computing environment in which embodiments may be practiced.

FIG. 5 illustrates an example of a suitable computing system environment 500 on which embodiments may be implemented. The computing system environment 500 is only one example of a suitable computing environment and is not intended to suggest any limitation as to the scope of use or functionality of the claimed subject matter. Neither should the computing environment 500 be interpreted as having any dependency or requirement relating to any one or combination of components illustrated in the exemplary operating environment 500.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 5, an exemplary system for implementing some embodiments includes a general-purpose computing device in the form of a computer 510. Components of computer 510 may include, but are not limited to, a processing unit 520, a system memory 530, and a system bus 521 that couples various system components including the system memory to the processing unit 520.

Computer 510 typically includes a variety of computer readable media. Computer readable media can be any available media that can be accessed by computer 510 and includes both volatile and nonvolatile media, removable and non-removable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during startup, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, application programs 545, pattern recognition modules 546, and program data 547. Note that these components can either be the same as or different from operating system 534, application programs 535, other program modules 536, and program data 537.

A user may enter commands and information into the computer 510 through input devices such as a keyboard 562, a microphone 563, and a pointing device 561, such as a mouse, trackball or touch pad. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590.

The computer 510 is operated in a networked environment using logical connections to one or more remote computers, such as a remote computer 580. The remote computer 580 may be a personal computer, a hand-held device, a server, a router, a network PC, a peer device or other common network node, and typically includes many or all of the elements described above relative to the computer 510. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on remote computer 580. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   setting a number of states for a multi-state pattern recognition model;
   a processor assigning different numbers of kernels to different states based on likelihoods of training data, wherein assigning different numbers of kernels to different states comprises:
     training an initial multi-state pattern recognition model using a uniform number of kernels for each state;
     training a second initial multi-state pattern recognition model using a second uniform number of kernels for each state;
     determining changes in likelihood caused by reducing the number of kernels for each state by one using the initial multi-state pattern recognition model and the second initial multi-state pattern recognition model; and
     reducing the number of kernels in the one state that results in the smallest change in likelihood; and
   training the kernels using training data to form the multi-state pattern recognition model.

2. The method of claim 1 wherein determining changes in likelihood comprises:
   determining a likelihood associated with a state with the uniform number of kernels;
   determining a likelihood associated with the state with the second uniform number of kernels; and
   determining the difference between the likelihood associated the uniform number of kernels and the likelihood associated with the second uniform number of kernels.

3. The method of claim 2 wherein determining a likelihood associated with a state comprises determining a normalized likelihood that is normalized based on an average occupation count for the state using different numbers of kernels.

4. The method of claim 1 wherein training the initial multi-state pattern recognition model comprises determining distribution parameters for each kernel in each state.

5. The method of claim 4 wherein training the multi-state pattern recognition model comprises for each state in which the number of kernels was reduced, combining distribution parameters for at least two kernels to form distribution parameters for a kernel.

6. The method of claim 5 wherein training the multi-state pattern recognition model comprises training the multi-state pattern recognition model using the distribution parameters that were formed by combining distribution parameters for at least two kernels as initial model parameters.

7. The method of 1 wherein training the kernels using training data to form the multi-state pattern recognition model comprises forming a multi-state pattern recognition model that has the same number of model parameters as a multi-state pattern recognition model with a uniform number of kernels for each state but that outperforms the multi-state pattern recognition model with a uniform number of kernels for each state.

8. The method of claim 1 wherein training the kernels using training data to form the multi-state pattern recognition model comprises forming a multi-state pattern recognition model that has fewer model parameters than a multi-state pattern recognition model with a uniform number of kernels for each state and performs the same or better than the multi-state pattern recognition model with a uniform number of kernels for each state.

9. A method comprising:
    training an initial multi-state pattern recognition model using a uniform number of kernels per state;
    training a second initial multi-state pattern recognition model using a second uniform number of kernels per state;
    a processor reducing the number of kernels for at least one state based on likelihoods for training data; and
    using the reduced number of kernels to retrain the multi-state pattern recognition model.

10. The method of claim 9 wherein reducing the number of kernels for at least one state comprises:
    determining a likelihood associated with a state and the uniform number of kernels;
    determining a second likelihood associated with the state and the second uniform number of kernels;
    determining the difference between the likelihood and the second likelihood; and
    using the difference to determine whether to change the number of kernels in the state from the uniform number of kernels to the second uniform number of kernels.

11. The method of claim 10 wherein reducing the number of kernels for at least one state further comprises:
    determining a likelihood for each state and the uniform number of kernels;
    determining a second likelihood for each state and the second uniform number of kernels;
    determining a difference between the likelihood and the second likelihood for each state; and
    changing the number of kernels in the state with the smallest difference.

12. The method of claim 9 wherein training an initial multi-state pattern recognition model using a uniform number of kernels per state comprises determining separate model parameters for each kernel and wherein using the reduced number of kernels to retrain the multi-state pattern recognition model comprises combining model parameters for at least two kernels in the initial multi-state pattern recognition model to form model parameters for a cluster of kernels and retraining the model parameters for the cluster of kernels.

13. A method comprising:
    assigning kernels to each of a plurality of states for a multi-state recognition model;
    a processor determining a reduction in a likelihood for each of the plurality of states that would occur if the number of kernels for a respective state was reduced, wherein determining a reduction in likelihood comprises training a plurality of initial multi-state recognition models, each initial multi-state recognition model associated with a separate uniform number of kernels per state, and using at least two of the initial multi-state recognition models to determine the reduction in likelihood;
    reducing the number of kernels for the state with the smallest reduction in likelihood; and
    training parameters for the kernels in the states to form the multi-state recognition model.

14. The method of claim 13 wherein using the at least two initial multi-state recognition models comprises determining a normalized likelihood based on one of the multi-state recognition models and an average occupation count for the state that is based on the at least two initial multi-state recognition models, and using the normalized likelihood to determine the reduction in likelihood.

15. The method of claim 13 wherein training parameters for the kernels in the states to form the multi-state recognition model comprises combining parameters for at least two kernels in an initial multi-state recognition model to form parameters for a cluster of kernels and retraining the parameters for the cluster of kernels to form the multi-state recognition model.

16. The method of claim 13 wherein reducing the number of kernels for a state results in an unequal number of kernels for different states.

* * * * *